No. 775,403. PATENTED NOV. 22, 1904.
A. S. KAPLAN.
TRACTION VEHICLE.
APPLICATION FILED FEB. 29, 1904.
NO MODEL. 3 SHEETS—SHEET 1.
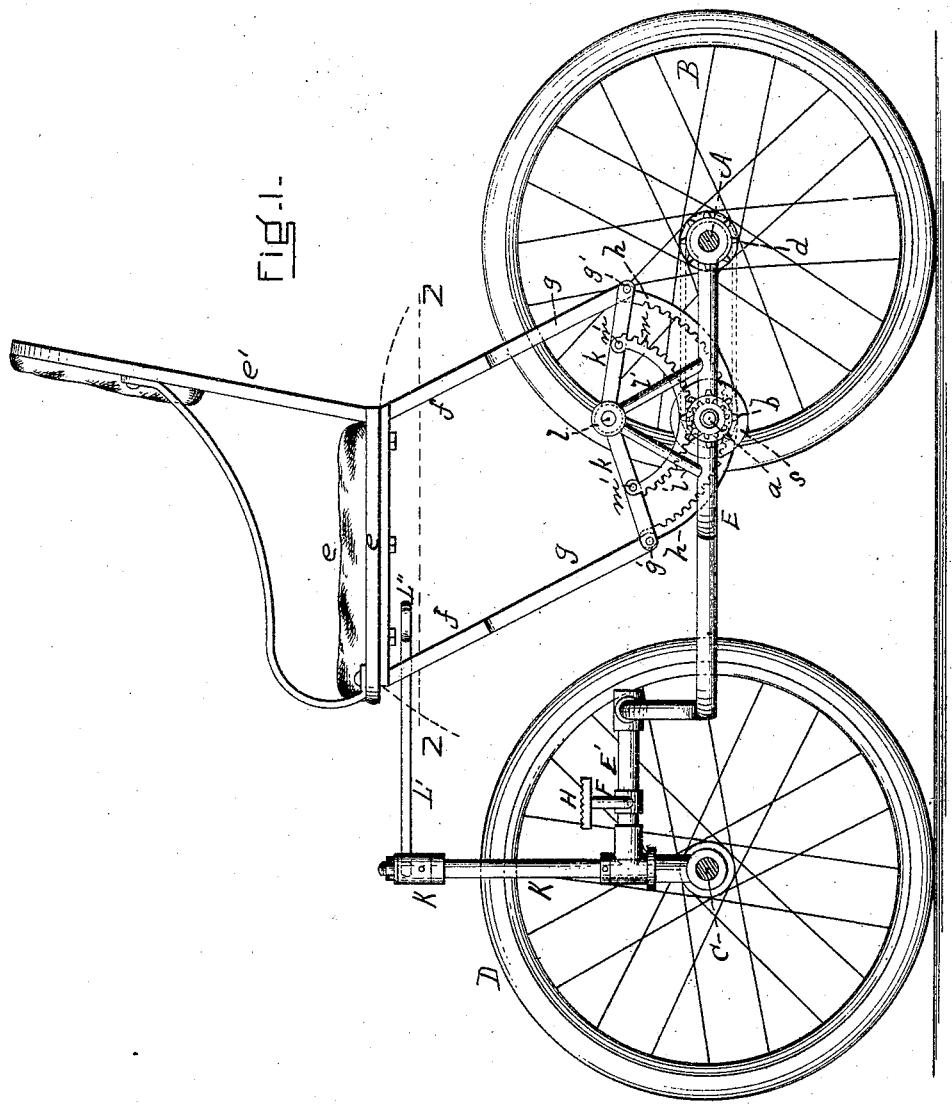
WITNESSES:
A. L. Hood
C. L. Baker
INVENTOR:
Abraham S. Kaplan
By his Atty.
Henry W. Williams No. 775,403. PATENTED NOV. 22, 1904.
A. S. KAPLAN.
TRACTION VEHICLE.
APPLICATION FILED FEB. 29, 1904.
NO MODEL. 3 SHEETS—SHEET 2.
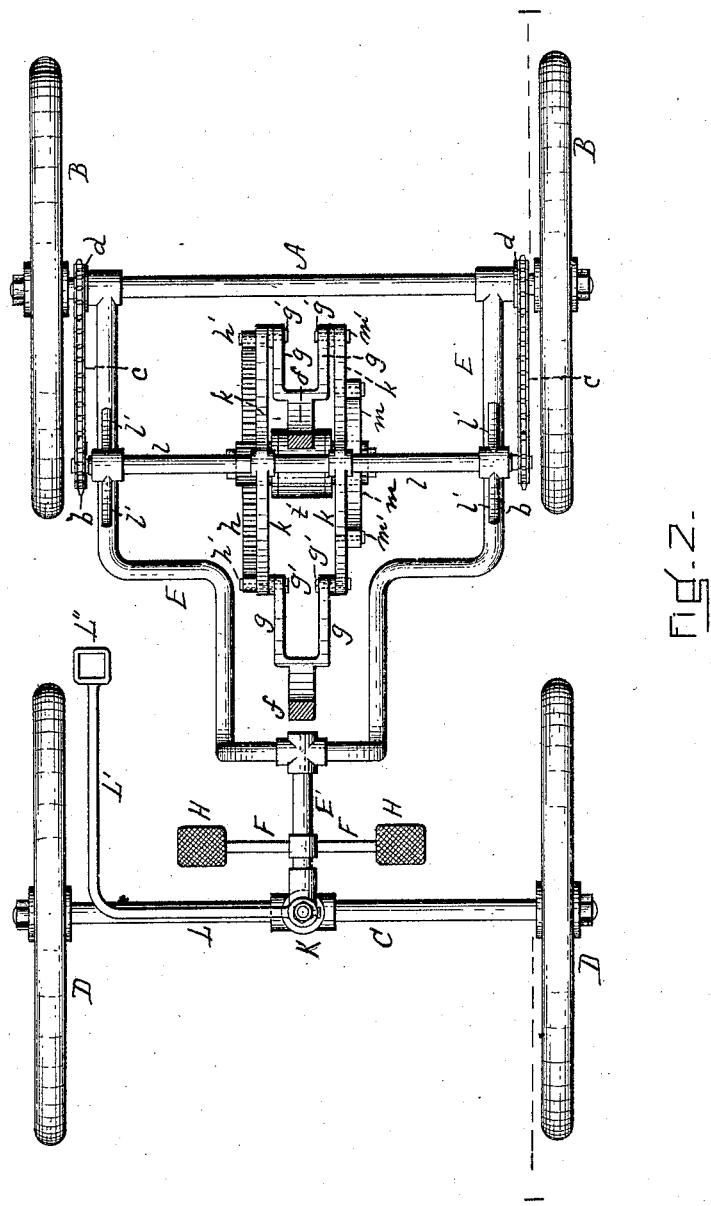
WITNESSES:
A. K. Hood
C. L. Baker
INVENTOR
Abraham S. Kaplan
By his Att'y.

No. 775,403. PATENTED NOV. 22, 1904.
A. S. KAPLAN.
TRACTION VEHICLE.
APPLICATION FILED FEB. 29, 1904.
NO MODEL. 3 SHEETS—SHEET 3.

WITNESSES:
A. L. Hood
C. L. Baker

INVENTOR:
Abraham S. Kaplan
By his Att'y.
Henry W. Williams

No. 775,403. Patented November 22, 1904.

UNITED STATES PATENT OFFICE.

ABRHAM S. KAPLAN, OF BOSTON, MASSACHUSETTS.

TRACTION-VEHICLE.

SPECIFICATION forming part of Letters Patent No. 775,403, dated November 22, 1904.

Application filed February 29, 1904. Serial No. 195,771. (No model.)

*To all whom it may concern:*

Be it known that I, ABRHAM S. KAPLAN, a citizen of the United States, residing in Boston, in the county of Suffolk and State of Massachusetts, have invented certain new and useful Improvements in Traction-Vehicles, of which the following is a specification.

This invention relates to that class of vehicles in which the driving power is produced by the rocking or forward and rearward movement or swaying of the body of the rider or occupant of the vehicle, the power derived from said movement being communicated to the driving-wheels of the carriage; and the invention consists in the novel construction and mechanism hereinafter described and illustrated in the accompanying drawings, in which—

Figure 4:
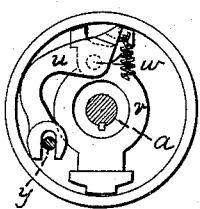
Figure 5:
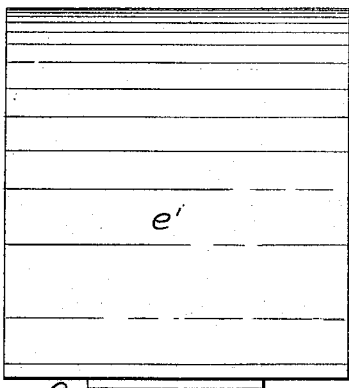
Figure 3:
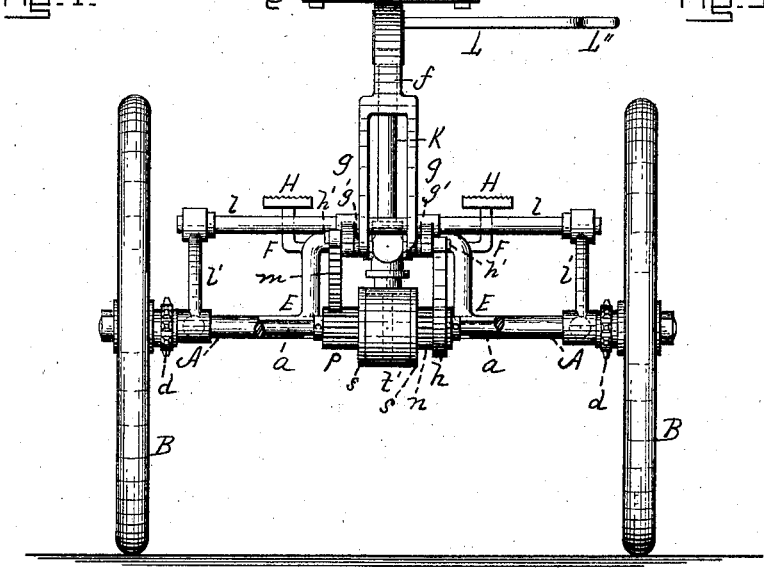

Figure 1 is a section and elevation of a traction-vehicle embodying my invention, the section being taken on line 1, Fig. 2. Fig. 2 is a horizontal section and plan, the section being taken on line 2, Fig. 1. Fig. 3 is a rear elevation of the vehicle. Fig. 4 is a vertical section looking toward the left taken through one of the parts constituting the clutch mechanism. Fig. 5 is a cross-section taken through the entire clutching mechanism, the driving-shaft being shown in elevation.

Similar letters of reference indicate corresponding parts.

A represents the rear shaft, which directly drives the rear wheels B.

C is the axle, on which are the front wheels D, said axle and front wheels being connected by the frame E with the shaft A, which turns in said frame, and the front portion E' of the frame being provided with oppositely-extending arms F, which support foot-rests H. Extending upward from the axle C is the steering-head K, to which is rigidly secured the steering-lever L, which extends parallel with the axle C and is then bent rearward into the portion L', provided at its end with the handle L'', whereby the vehicle can be steered by the occupant without the steering-lever interfering with the legs, which are supported by the foot-rests.

$a$ represents the driving-shaft supported horizontally by the frame and provided with sprocket-wheels $b$, which are connected by chains $c$ with sprocket-wheels $d$ on the shaft A.

$e$ represents a seat, of which $e'$ is the back, said seat having rigidly secured to its under side a rocking frame, preferably of metal, and comprising the parallel bars $f$, extending downward from the seat at a rearward angle therewith and secured, respectively, to the seat near the front and rear edges thereof, said bars being bifurcated, whereby the lower portion of each is formed into a pair of arms $g$, the arms of each pair being on opposite sides of a longitudinal line drawn centrally through the vehicle and the pairs of arms being directly in front of each other. The corresponding arms $g$ in each pair are rigidly secured at their lower ends at $g'$ to the opposite ends of a rocking frame $k$, there being two such frames, one connecting the right arms and the other connecting the left arms, as shown in Fig. 2. These frames rock on a horizontal rod $l$, which is supported at its ends by posts $l'$, extending from the frame of the vehicle. Secured at $h'$ and $m'$, respectively, to the outer surfaces of the rocking frames $k$ are two racks $h$ and $m$. These two racks curve downward from the rocking frames and are concentric, the rack $h$ having teeth on its upper edge and the rack or sector $m$ having teeth on its lower edge. These racks $h$ and $m$ engage, respectively, gear-wheels $n$ and $p$ on the hubs $r$ rigid with the disks $s$ of the two members of a clutch mechanism on the driving-shaft $a$, whereby the said shaft may be engaged alternately by the two members of the clutch. This clutch mechanism is not new in this invention, and I do not confine myself to a clutch of this particular construction, as any clutch made with two members which can operate alternately to engage the driving-shaft to impart rotation in the same direction may be employed. The clutch illustrated is of well-known construction and comprises the central disk $t$, rigid on the shaft $a$ and provided with the oppositely-extending annular flanges $t'$, the disks $s$, above mentioned, which are rigid, respectively, with the hubs $r$, provided with the gears $n$ and $p$, and the internal mechanism consisting of the spreading or engaging levers or dogs $u$ and $v$, pivotally connected at $w$ and brought into operation by the pins $y$, extending into engagement therewith from the disks $s$, such operation being common and needing no further description.

In practical operation the occupant sits upon the seat with his feet on the foot-rests $h$ and moves his body back and forth longitudinally with the vehicle from the position shown in the drawings, which is a substantially central position. The seat travels on substantially the curved line indicated in Fig. 1, and as it thus reciprocates on an arc of a circle, of which the rod $l$ is the center, the gear-wheels $p$ and $n$ are engaged alternately by the racks, thus actuating alternately the two members of the clutch mechanism and imparting forward rotation to the driving-shaft $a$, propelling the vehicle by means of the connecting mechanism $b$, $c$, and $d$. As will be seen by reference to the drawings, when the rider moves the seat $e$ forward the rack $h$ engages the gear-wheel $n$ from below and causes the clutch member on that side to engage the driving-shaft $a$, thus imparting forward rotation to it and to the driving-wheels B, the other clutch member slipping. When the rider swings the seat backward, the rack $m$ engages the gear-wheel $r$ from above and causes the clutch member on that side to engage the driving-shaft $a$, thus imparting forward rotation to it and to the driving-wheels B, the other clutch member slipping. Thus continuous rotation in the same direction is imparted by the rocking or forward and rearward swaying of the rider, imparting similar movement to the seat, the rider utilizing the foot-rests as stationary and bearing points.

Any desirable steering apparatus may be employed, and it is evident that I need not confine myself to a quadricycle, as the same mechanism can be applied to a tricycle.

In addition to the fact that a satisfactory speed may be be obtained by this method of propulsion the exercise derived from propelling the vehicle is exceedingly beneficial and is distributed practically throughout the different portions of the limbs and trunk of the body.

Having thus fully described my invention, what I claim, and desire to secure by Letters Patent, is—

1. In a vehicle of the character described, a vehicle-frame; a seat-supporting frame comprising two downwardly-extending bars $f$ rigid with the seat and each formed into the bifurcated lower end $g$, and a pair of rocking bars $k$ rigidly connected with the lower ends of the bars $f$ and pivotally supported by the vehicle-frame; a driving-shaft supported by the vehicle-frame; mechanism intermediate of the driving-shaft and the rocking bars whereby the forward and rearward rocking of the seat-supporting frame turns the driving-shaft in the same direction; and mechanism intermediate of the driving-shaft and the driving-wheels for imparting rotation to the latter.

2. In a vehicle of the character described, a vehicle-frame; a driving-shaft supported thereby and means for transmitting motion therefrom to the driving-wheels; a double clutch on said shaft; two gear-wheels rigid with the two members of the double clutch; a pair of concentrically-disposed racks having inwardly-facing teeth, one rack being in engagement with one gear-wheel from above, and the other rack being in engagement with the other gear-wheel from below; and a seat-supporting rocking frame pivotally supported by the vehicle-frame and adapted to rock or swing longitudinally therewith, said rocking frame and racks being rigidly connected.

3. In a vehicle of the character described, a vehicle-frame; a driving-shaft supported thereby and means for transmitting motion therefrom to the driving-wheels; a seat-supporting frame comprising the downwardly-extending pair of bars $f$ formed with the bifurcated lower ends $g$; a pair of longitudinally-disposed rocking bars $k$ connecting the bifurcated ends $g$ on each side; two concentrically-disposed racks having inwardly-facing teeth, one rack being supported by each rocking bar; a double clutch mechanism on the driving-shaft; and a gear-wheel rigid with each of the two parts of said clutch, said gear-wheels being engaged respectively from above and below by the two racks, whereby the racks engage alternately the gear-wheels as the rocking frame swings forward and rearward, and the shaft is turned in the same direction by the said gear-wheels, substantially as set forth.

In testimony whereof I have signed my name to this specification in the presence of two subscribing witnesses.

ABRHAM S. KAPLAN.

Witnesses:
   HENRY W. WILLIAMS,
   A. K. HOOD.